(12) United States Patent
Fryxell et al.

(10) Patent No.: US 8,138,117 B2
(45) Date of Patent: Mar. 20, 2012

(54) FUNCTIONALIZED SORBENT FOR CHEMICAL SEPARATIONS AND SEQUENTIAL FORMING PROCESS

(75) Inventors: Glen E. Fryxell, Kennewick, WA (US); Thomas S. Zemanian, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 254 days.

(21) Appl. No.: 12/555,374

(22) Filed: Sep. 8, 2009

(65) Prior Publication Data

US 2011/0059845 A1    Mar. 10, 2011

(51) Int. Cl.
*B01J 20/26*    (2006.01)

(52) U.S. Cl. ................................................ 502/402

(58) Field of Classification Search .......... 502/400–402; 528/10, 28, 61, 68, 69; 422/612; *C08G 18/32, C08G 77/452, 77/62*
See application file for complete search history.

(56) References Cited

U.S. PATENT DOCUMENTS

| | | | |
|---|---|---|---|
| 7,553,547 B2 | 6/2009 | Fryxell et al. | |
| 2008/0185333 A1* | 8/2008 | Gibson et al. | 210/508 |

OTHER PUBLICATIONS

Hicks et al., "Controlling the Density of Amine Sites on Silica Surfaces Using Benzyl Spacers," Langmuir 2006, vol. 22, pp. 2676-2681 (Feb. 8, 2006).*

Kanan et al., "Method to Double the Surface Concentration and Control the Orientation of Adsorbed (3-Aminopropyl)dimethylethoxysilane on Silica Powders and Glass Slides," Langmuir 2002, vol. 18, pp. 6623-6627 (Jul. 24, 2002).*

Acosta et al., "Engineering Nanospaces: Iterqative Synthesis of Melamine-Based Dendrimers on Amine-Functionalized SBA-15 Leading to Complex Hybrids with Controllable Chemistry and Porosity," Advanced Materials 2004, vol. 16, No. 12, pp. 985-989 (Jun. 17, 2004).*

Ford et al., "Engineering nanospaces: ordered mesoporous silicas as model substrates for building complex hybrid materials," Nanotechnology 2005, vol. 16, pp. S458-S475 (May 18, 2005).*

International Search Report/Written Opinion, International Application No. PCT/US2010/039533, International Filing Date Jun. 22, 1010, Date of mailing Oct. 25, 2010.

Rosenholm, J. M. et al., Wet-Chemical Analysis of Surface Concentration of Accessible Groups on Different Amino-Functionalized Mesoporous SBA-15 Silicas, Chemistry of Materials, vol. 19, No. 20, Sep. 7, 2007, pp. 5023-5034.

Knowles, G. P. et al., Diethylenetriamine[propyl(silyl)]-Functionalized (DT) Mesoporous Silicas as CO2 Adsorbents, Industrial & Engineering Chemistry Research, vol. 45, No. 8, Feb. 25, 2006, pp. 2626-2533.

Reynhardt, J. P. K. et al., Periodic Mesoporous Silica-Supported Recyclable Rhodium-Complexed Dentrimer Catalysts, Chemistry of Materials, vol. 16,, No. 21, Sep. 18, 2004, pp. 4095-4102.

Yoshitake, H. et al., Polyamine-functionalized mesoporous silicas: Preparation, structural analysis and oxyanion adsorption, Microporous and Mesoporous Materials, Elsevier Science Publishing, New York, U.S., vol. 85, No. 1-2, Oct. 23, 2005, pp. 183-194.

(Continued)

*Primary Examiner* — Stanley Silverman
*Assistant Examiner* — Daniel Berns
(74) *Attorney, Agent, or Firm* — James D. Matheson

(57) ABSTRACT

A highly functionalized sorbent and sequential process for making are disclosed. The sorbent includes organic short-length amino silanes and organic oligomeric polyfunctional amino silanes that are dispersed within pores of a porous support that form a 3-dimensional structure containing highly functionalized active binding sites for sorption of analytes.

21 Claims, 5 Drawing Sheets

OTHER PUBLICATIONS

Khatri, Rajesh A., et al., Thermal and Chemical Stability of Regenerable Solid Amine Sorbent for CO2 Capture, Energy & Fuels, 2006, 20, 1514-1520.

Harlick, Peter J. E., et al., Applications of Pore-Expanded Mesoporous Silica. 5. Triamine Grafted Material with Exceptional CO2 Dynamic and Equilibrium Adsorption Performance, Ind. Eng. Chem. Res. 2007, 46, 446-458.

Aroua, Mohamed Kheireddine, et al., Adsorption capacities of carbon dioxide, oxygen, nitrogen and methane on carbon molecular basket derived from pollyethyleneimine impregnation on microporous palm shell activated carbon, Separation and Purification Technology, 62, 2008, 609-613.

Yin, Chun Yang, et al., Polyethyleneimine impregnation on activated carbon: Effects of impregnation amount and molecular number on textural characteristics and metal adsorption capactieis, Materials Chemistry and Physics 112, 2008, 417-422.

Tsuda, Tetsuo, et al., Polyethyleneimine and Macrocyclic Polyamine Silica Gels Acting as Carbon Dioxide Absorbents, J. Chem. Soc., Chem. Commun. 1992, 1659-1661.

* cited by examiner

US 8,138,117 B2

FUNCTIONALIZED SORBENT FOR CHEMICAL SEPARATIONS AND SEQUENTIAL FORMING PROCESS

This invention was made with Government support under Contract DE-AC05-76RLO1830 awarded by the U.S. Department of Energy. The Government has certain rights in the invention.

FIELD OF THE INVENTION

The present invention relates generally to sorbent materials and methods for selective capture and retention of target species. More particularly, the invention relates to a porous sorbent and process for chemical separations and retention of preselected gases.

BACKGROUND OF THE INVENTION

Selective capture and retention of unwanted gases, e.g., in flue gas streams, are of high interest. Various methods are known for sorption of gases including, e.g., use of liquids such as monoethanol amine (MEA). However, liquid amines can have volatile emissions, corrode infrastructure, quickly reach saturation, suffer from slow capture kinetics, and can degrade over time, losing capacity. Fluid methods thus have serious limitations for long-term chemical sorption and retention of unwanted gases. Accordingly, new solid phase sorption materials and methods are needed that are stable, exhibit fast sorption kinetics, provide long-term retention of unwanted gases, and are capable of being regenerated, providing for long service lifetimes. Additional advantages and novel features of the present invention will be set forth as follows and will be readily apparent from the descriptions and demonstrations set forth herein. Accordingly, the following descriptions of the present invention should be seen as illustrative of the invention and not as limiting in any way.

SUMMARY OF THE INVENTION

The invention in one aspect is a sequentially functionalized, solid-state sorbent for chemical sorption that provides for capture and retention of preselected target analytes. The sorbent includes: a porous support (substrate) of a preselected porous material that includes pores of a preselected size, pore volume, and surface area. The porous support is composed of a preselected material including, but not limited to, e.g., metals, transition metals, main group metalloids, metal oxides, ceramic oxides, oxide coated materials, metal silicates, including combinations of these porous materials. Metals include, e.g., aluminum (Al), and tin (Sn). Transition metals include, but are not limited to, e.g., titanium (Ti), zirconium (Zr), zinc (Zn), iron (Fe), nickel (Ni), copper (Cu), including combinations of these metals. Main group metalloids include, but are not limited to, e.g., Si, Ge, As, Sb, Bi, including combinations of these metalloids. Metal oxides include, but are not limited to, e.g., $Al_2O_3$, $Ga_2O_3$, $GeO_2$, $SnO_2$, and combinations of these oxides. Ceramic oxides include, but are not limited to, e.g., $SiO_2$ and $TiO_2$. The porous support includes pores with a pore size of from about 30 Å to about 500 Å. The porous support further includes a pore volume that is greater than or equal to about 0.5 cc/g. More particularly, the pore volume is in the range from about 1 cc/g to about 3 cc/g, but is not limited thereto. Porous support includes a specific pore surface area greater than or equal to about 150 $m^2/g$. More particularly, specific pore surface area is in the range from 200 $m^2/g$ to about 1500 $m^2/g$. Pores of the porous support are functionalized with a preselected quantity of short-length (e.g., 5-20 Å) amino silanes that are chemically attached to surfaces (e.g., walls) of the pores, and substantially evenly distributed within the pores. In various embodiments, the short-length amino silanes include a terminal amine group. In one embodiment, the terminal amine group includes diethylenetriamine (DETA). In one embodiment, the short-length organic amino silane is 3-diethylenetriamine (DETA)-propyltrimethoxysilane. Short-length organic amino silanes preferably have a molecular weight of less than about 300 g/mol. Pores of the porous support further include a preselected quantity of organic polyfunctional oligomeric amino silanes (e.g., 25-45 Å) that are chemically attached to surfaces within the pores and interspersed between previously attached short-length amino silanes. The polyfunctional oligomeric amino silanes are substantially evenly dispersed across the pore surface within the pore. In one embodiment, the terminal group of the polyfunctional oligomeric amino silanes includes polyethyleneimine (PEI). In various embodiments, the polyfunctional oligomeric amino silanes have a molecular weight of from about 200 g/mol to about 1000 g/mol, but molecular weight is not limited thereto. Pores of the support further include a quantity of other short-length (e.g., 5-20 Å) amino silanes of like or different kind that are interspersed and chemically attached between previously attached short-length amino silanes and previously attached polyfunctional oligomeric amino silanes that serve to backfill open locations across the surface of the pores, forming the fully functionalized sorbent. The short-length organic amino silanes and organic polyfunctional oligomeric amino silanes in combination define a three-dimensional structure of active binding sites that are oriented substantially orthogonal to surfaces of the pores of the support. Crosslinking of silane groups between the short length organic amino silanes and the organic polyfunctional oligomeric amino silanes at the surface serves to maintain the 3-dimensional structure of amino silanes within the pores and further provides thermal stability of the solid-state sorbent. Amine functional groups present on the backbone of the highly functionalized silanes of the sorbent define active binding sites that provide the sorbent with a preselected functional density, selectivity, and capacity for retention of preselected target analytes. Functional density of the sorbent is defined by at least 3 or more amine functional groups per square nanometer of sorbent surface area. The density of active binding sites provide a preselected selectivity and capacity to selectively sorb, bind, capture, and retain preselected target analytes on the porous support of the sequentially functionalized sorbent when contacted by the analytes, including, e.g., gaseous analytes. Gaseous analytes include, but are not limited to, e.g., HCl, $SO_2$, $SO_3$, $CO_2$, and combinations of these gases. In various embodiments, the binding sites of the sorbent can be further modified to include various functional groups including, but not limited to, e.g., thiols, carboxylates, sulfonates, phosphonates, phosphines, heteroaromatic ligands, ammonium salts, phosphonium salts, and combinations of these functional groups to provide selective binding for various target analytes. Heteroaromatic ligands include, but are not limited to, e.g., pyridines; 1,10-phenanthroline; 2,2'-bipyridine; and combinations of these ligands. The sorbent can be functionalized in various organic solvents, in supercritical fluids, or in the vapor phase. The sorbent can be used as a component of a sorption system or device, e.g., for trapping unwanted gases in a flue gas stream. The sorbent can also be used as a component of, e.g., analysis devices and applications, assay devices and applications, chemical separations devices and applications, including, e.g., biomedical devices and applications. No limitations are intended.

In another aspect, the invention includes a method for making a sequentially functionalized sorbent that provides for capture and retention of preselected analytes. In one functionalization step, pores of the support are pretreated and functionalized with a sub-monolayer quantity of a short-length (e.g., 5-20 Å) organic amino silane that is chemically attached to surfaces (e.g., walls) of the pores, and substantially evenly distributed within the pores. The pretreatment with short-length amino silane passivates the surface to allow passage and diffusion of other molecules larger than the short-length amino silanes into the pores of the porous support. In various embodiments, the short-length organic amino silane is an aminoalkylsilane selected from the group consisting of: aminopropylsilanes; and 3-(2-aminoethyl)aminopropylsilanes; 3-(diethylenetriamine)-propylsilanes, including combinations of these silanes. In a preferred embodiment, the short-length amino silane is a diethylenetriamine (DETA) amino silane. In another embodiment, the short-length organic amino silane is 3-diethylenetriamine (DETA) propyltrimethoxysilane. In a preferred embodiment, the sequentially functionalized sorbent includes short-length organic amino silanes with a molecular weight less than about 300 g/mole. The step of pretreating includes chemically dispersing short aminoalkylsilane molecules throughout the porous support in a sub-monolayer quantity, and then subjecting them to hydrolysis/condensation chemistry to chemically attach them to surfaces within the pores. This pretreatment step enables functionalization in subsequent functionalization steps to include larger aminosilane molecules to percolate easily throughout the porous support by saturating hydroxyl groups located at the surface of the pores through an acid/base interaction with the amine backbones of the aminosilanes introduced the pores. The step of pretreating includes heating the porous support at a temperature of from about 50° C. to about 150° C. In one embodiment, the step of pretreating includes use of a quantity of the short-length amino silane that is between about 10% and 50% of the monolayer quantity. In another embodiment, the step of pretreating includes use of a quantity of the short-length amino silane between about 5% and 50% by weight of the monolayer quantity. In another (sequential) functionalization step, pores of the support are functionalized with a preselected quantity of an organic polyfunctional oligomeric amino silane (e.g., 25-45 Å) that is deposited, and chemically attached, to surfaces within the pores and interspersed between previously attached short length amino silanes such that they are substantially evenly dispersed across the pore surface within the pore. In various embodiments, polyfunctional oligomeric amino silanes include an aminated terminal group including, e.g., polyethylene imines; aminodendrimers; aminated polymers; aminated chitosans; aminoethylcelluloses; aminomethylpolystyrenes; and combinations of these amines. In a preferred embodiment, the polyfunctional oligomeric amino silane is a polyethyleneimine (PEI) silane. In one embodiment, the polyfunctional oligomeric amine silane includes polyethylene imine (PEI) that has been chemically modified to include a propyltrimethoxysilane anchor. In another embodiment, the step of depositing includes use of a polyethyleneimine (PEI) silane that is deposited using a method of incipient wetness (i.e., uses concentration solution) to occupy about 90% of the total pore volume of the porous support sample. In another functionalization step, pores of the support are backfilled with a preselected quantity of another short-length amine of like or different kind that chemically attach to the surface within the pores, backfilling the pores. Backfilling orients both short-length amines and polyfunctional oligomeric amines substantially orthogonal-to the surface forming a three-dimensional structure of active binding sites defined by amine groups on the silanes attached at the surface that provide the sorbent with a preselected functional density, selectivity, and capacity for capture and retention of target analytes. In various embodiments, the step of backfilling includes use of a short-length amino silane selected from: aminopropylsilanes; 3-(2-aminoethyl)aminopropylsilanes; 3-(diethylenetriamine)-propylsilanes; including combinations of these silanes. The step of backfilling includes crosslinking between adjacent siloxane groups located on the various short-length amino silanes and organic polyfunctional oligomeric amino silanes chemically attached at the surface that serves to maintain the 3-dimensional structure of active binding sites within the pores of the sorbent. The sorbent has a demonstrated sorption capacity for $CO_2$ that yields a residual concentration of $CO_2$ in air of below 0.01% in a time of less than one second. The deposition of polyfunctional oligomeric amine silane polymers is accomplished by chemically modifying the amine with an organosilane coupling agent. In various embodiments, the organosilane coupling agent includes, but is not limited to, e.g., 3-isocyanatopropyltrialkoxysilanes; 3-chloropropyltrialkoxysilanes; 3-bromopropyltrialkoxysilanes; 3-iodopropyltrialkoxysilanes; 2-isocyanatoethyltrialkoxysilanes; 2-chloroethyltrialkoxysilanes; 2-bromoethyltrialkoxysilanes; 2-iodoethyltrialkoxysilanes; 4-(chloromethylphenyl)trialkoxysilanes; including combinations of these coupling agents. The step of back-filling is accomplished by a subsequent treatment of the pretreated support with a short-length aminoalkylsilane that fills in defects left over from the polymer deposition. The net result of these 3 sequential treatment steps is a higher overall functional loading than is possible with standard coating methods using typical amine terminated silanes. In one embodiment, the polyfunctional oligomeric amine is PEI and the polyfunctional oligomeric aminosilane is PEI silane. The sequentially functionalized sorbent provides a sorption capacity for target analytes that is from 2× to 3× greater than possible with sorbents made using standard coating methods using typical amine terminated silanes. The sequentially functionalized sorbent of the invention has a sorption capacity that can deplete concentrations of gas-phase target analytes. In one embodiment, the sequentially functionalized sorbent removes $CO_2$ to below 0.01% in less than one second. Time to capture a gas phase analyte is dependent on the selected analyte specific gas, and the molecular weight of the gas. Thus, no limitations are intended.

The purpose of the foregoing abstract is to enable the United States Patent and Trademark Office and the public generally, especially scientists, engineers, and practitioners in the art who are not familiar with patent or legal terms or phraseology, to determine quickly from a cursory inspection the nature and essence of the technical disclosure of the application. The abstract is neither intended to define the invention, which is measured by the claims, nor is it intended to be limiting as to the scope of the invention in any way. Various advantages and novel features of the present invention are described herein and will become readily apparent to those skilled in this art from the following detailed description. Only the preferred embodiment of the invention is shown and described to illustrate the best mode contemplated for carrying out the invention. As will be realized, the invention is capable of modification in various respects without departing from the invention. Accordingly, the drawings and description of the preferred embodiment set forth hereafter are to be regarded as illustrative in nature, not as restrictive.

DETAILED DESCRIPTION

Figure 1A:
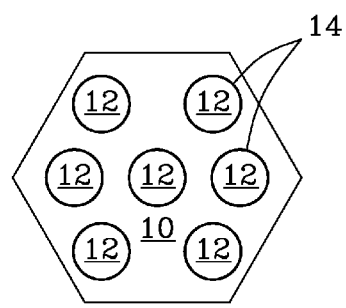
FIG. 1a is a cross-sectional view of a porous support used in conjunction with the invention.

A sequentially functionalized, porous solid-state sorbent is described that provides for the chemical sorption and retention of target analytes including, e.g., target gases, e.g., in flue gas streams. The sorbent has a substantially high surface area, is highly permeable, and has good physical and thermal stability. The porous sorbent includes pores of a preselected size, quantity, pore volume, and specific surface area that permit various amines and polymers with preselected sizes to enter and chemically attach to the surface within pores of the porous support. Amines and other basic molecules chemically interact with hydroxyl groups located on surfaces within pores of the selected porous support material (e.g., silica) via an acid/base interaction. The selected amines of polymer molecules are chemically modified to include a preselected alkoxysilane group that undergoes hydrolysis and condensation to covalently anchor selected molecules to surfaces (e.g., oxide surfaces) within the pores. The term "silanes" is used herein to describe general deposition precursors that are silicon-based analogues of alkanes that include Si—H and Si—C bonds. Silanes encompass compounds including, but not limited to, e.g., chlorosilanes, aminosilanes, alkylamine silanes, and like silanes. The term "siloxane" is used herein to denote terminal end-groups of alkylamine silanes of the form: —R—Si—O—, where R is a preselected hydrocarbon group. The siloxane end group is used to anchor the selected silane to the surface of the support. The term "siloxane" is thus used when drawing attention to the oxygen-silicon bond at the surface, for example, when discussing crosslinking between adjacent tethered silanes. These terminal end-groups can also be aminated. In a preferred embodiment described hereafter, a propyl-silyl anchor is used to bind alkylamine silanes to the surface through an oxygen-silicon (Si—O) bond.

The sequential attachment of short-length amino silanes on surfaces within the pores of the porous support in a first functionalization step saturates hydroxyl groups at the surface with the selected amino silanes, which pretreats the porous support allowing larger polyfunctional oligomeric amines and polymers to diffuse freely throughout the porous matrix in subsequent functionalization steps. Introduction and dissemination of larger polyfunctional oligomeric amines and polymers into the pores of the porous matrix in these subsequent functionalization steps does not occur absent the first functionalization step. In one embodiment described hereafter, the porous support is pre-treated with DETA silane that passivates hydroxyl groups on the acidic surface. Pretreatment of the surface facilitates introduction of PEI silane molecules that can further functionalize the surface within the pores. Absent pretreatment, PEI molecules do not diffuse readily through the porous matrix and are deposited predominantly at or near the mouth of the pores, which can plug the pores of the porous support. The inventive method of sequential attachment functionalizes the support sequentially, forming a unique 3-dimensional structure within the pores of the sorbent that provides a greater sorption capacity for capture and retention of various target analytes including, e.g., acid gases. The sorbent can be further functionalized with various functional groups including, but not limited to, e.g., carboxylates, sulfonates, phosphonates, and other groups that impart other types of chemical specificity to the sorbent, e.g., for sorption and retention of, e.g., transition metal cations, heavy metals, and/or radionuclides. The sorbent has extremely good sorption kinetics target analytes retained from the gas phase, as described further herein. The process of functionalization of active binding sites within pores of the sorbent can be carried out either in routine organic solvents or in supercritical fluids, and can involve various ligands, e.g., as detailed in U.S. Pat. No. 7,019,037; U.S. Pat. No. 6,846,554; U.S. Pat. No. 6,753,038; U.S. Pat. No. 6,733,835; U.S. Pat. No. 6,531,224; and U.S. Pat. No. 6,326,326, which patents are incorporated in their entirety, herein. Applications for the invention include, but are not limited to, e.g., uses in chemical catalysis; chemical separations; biomedical applications; capture of toxic heavy metals in the body or in the blood; controlled release of pharmaceuticals or pheromones; refining; chemical processing; and material recovery. Functionalized sorbents of the invention are easy-to-use, do not require complex chemical pre-treatment, transport of liquid samples, or large complicated instruments. Sorbents of the invention can further be used as components of, e.g., gas-capture and release devices. No limitations are intended. Sorbents of the invention provide rapid rates of sorption, e.g., as described further herein. The sorbents can also be relatively low cost to produce. Because the sorbents are solids, they also exhibit greater physical, chemical, and thermal stability compared to liquid sorbents.

Porous Support

FIG. 1a is a cross-sectional view of a porous support 10 used in conjunction with the sequentially functionalized sorbent of the invention. Porous support 10 is composed of a porous material including, but not limited to, e.g., silica ($SiO_2$); germania ($GeO_2$); alumina ($Al_2O_3$); metals, including transition metals (e.g., Ti; Zr); solid oxides (e.g., $SnO_2$, $ZnO_2$); as well as combinations of these materials. In a preferred embodiment, porous support 10 is composed of porous silica, but is not limited thereto. In the figure, porous support 10 includes pores 12. Pores 12 of the preferred porous silica support 10 have a preselected pore size and pore volume that retains the structure of the pores in the sorbent product. Pores are preferably of a size in the range from about 30 Å to about 150 Å, but size is not limited thereto. In one preferred size, pores 12 are about 50-60 Å, but again, size is not limited thereto. Pores 12 of porous support 10 include surfaces 14 that define the surface area and the pore volume of pores 12 of porous support 10. Specific surface area of porous support 10 is in the range from about 200 $m^2/g$ to about 1500 $m^2/g$, and preferably in the range from about 500 $m^2/g$ to about 1000 $m^2/g$. Pore volume is preferably in the range from about 1.0 cc/g to about 3.0 cc/g. The selected porosity enhances mass transport and kinetic properties in the fully functionalized product sorbent. In order to take full advantage of all of the surface area of the porous support, pores of the sorbent are functionalized in a manner that prevents plugging of the pores. Functionalization reagents must be dispersed uniformly throughout the porous matrix. The method of the invention, described further herein, sequentially functionalizes the sorbent that provides uniform dispersement of the functionalization reagents throughout the porous matrix. Those of skill in the ceramic processing and material arts will readily recognize that methods of the invention will be equally useful for silica particles derived from other particle and ceramic sources, e.g., precipitated silica, silica gels, chromatographic silica, and like sources. Thus, no limitations are intended by the description to the preferred embodiments described herein. All porous materials as will be contemplated or implemented by those of skill in the ceramic processing arts in view of the description of the invention are within the scope of the invention. No limitations are intended.

Figure 1B:
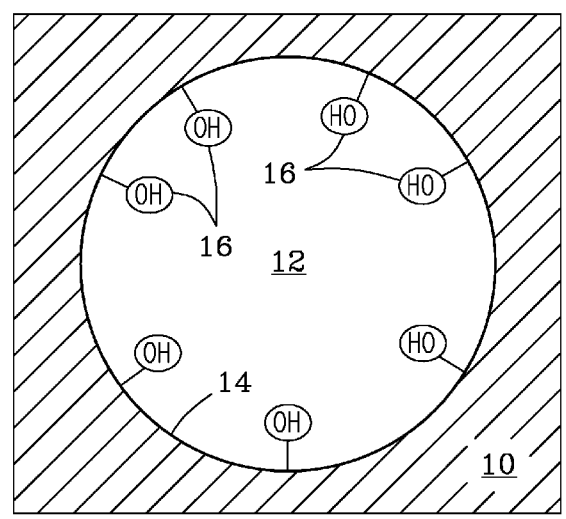
FIGS. 1b-c present different cross-sectional views of a representative pore of the porous support.
Figure 1C:
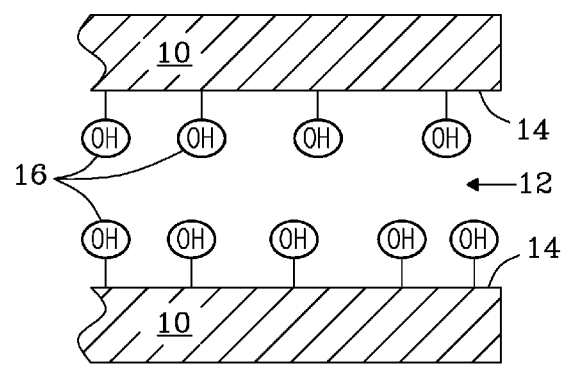

Mass transport properties of the porous support enhance both the sequential functionalization process for preparation of the sorbent, as well as the speed of sorption of analytes by the fully functionalized sorbent. In short, porosity of the silica template provides the sorbent with a suitable pore volume for functionalization and a suitable surface area for sorption of analytes that contact the sorbent, including, e.g., gas analytes. Other properties of the sorbent are described further herein. FIG. 1b shows a vertical cross-sectional view of a representative pore 12 of porous support 10. In the figure, pore 12 includes surfaces 14 (walls) that contain hydroxyl groups 16 under standard conditions that are chemically attached to the surface. FIG. 1c shows a horizontal cross-sectional view through pore 12. Hydroxyl groups 16 are again shown attached along surface 14 (wall) of pore 12 of porous support 10. Preparation of the functionalized sorbent will now be described.

Sorbent Preparation

Preparation of the sorbent includes a sequence of functionalization steps: 1) Passivation/pre-treatment with short-length or low-molecular weight amino silanes; 2) Deposition of polyfunctional oligomeric amines or polymers; and 3) Backfilling with another short-length or low-molecular weight amino silane. Each functionalization step is described further hereafter.

Passivation/Pretreatment

Figure 2A:
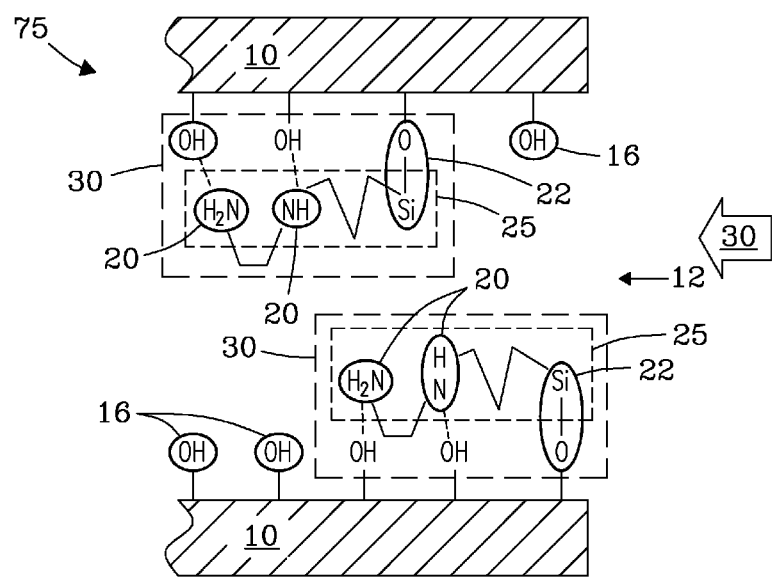
FIG. 2a shows surfaces of a pore of the silica support following pretreatment with short-length amine silanes.

FIG. 2a shows a cross-sectional view of pore 12 of porous support 10 immediately following a first functionalization step, {Step 102}, that passivates/pretreats surface 14 of pores 12. Plugging or clogging of pores 12 can result when constituents including amines (or other functional-group constituents) that are basic come in contact with acidic moieties such as hydroxyl groups found, e.g., on oxide (e.g., silica) surfaces, e.g., at pore openings. Any plugging that occurs significantly reduces the quantity of amines that can enter into, and be distributed within, the pores during steps that functionalize the support and ultimately form the fully functionalized sorbent. Thus, preventing clogging of pores of the porous silica support maximizes the functionalization density of the functionalized pores of the functionalized sorbent, and thus the ultimate sorption capacity of the sorbent. To minimize potential for plugging of pores, in a first sequential functionalization step {Step 102}, acidic hydroxyl groups 16 along the surface of pores 12 are passivated. Porous support 10 is pretreated with a low molecular weight or short-length alkyl amino silane 30 that serves to passivate acidic hydroxyl groups 16 located along surfaces 14 of pores 12. In the pretreatment step, porous silica 10 is mixed as a slurry with a short-length amino silane 30 dissolved in a preselected solvent (e.g., toluene). The term "short length" means a molecular weight less than about 300 g/mole. The low molecular weight alkyl amino silane 30 is readily and evenly distributed within pores 12 throughout porous support 10. Alkyl amino silanes 30 include a branched or unbranched aminated alkane bearing a siloxane (i.e., —R—Si—O—) linking group 22 that is capable of covalently attaching to a surface 14 (e.g., an oxide surface) of pore 12. Once attached, amine functional groups 20 that define active binding sites 20 of low molecular weight alkyl amino silane 30 then chemically associate with other hydroxyl groups 16, aligning in a first dimension (e.g., horizontally) along surface 14 of pore 12, which anchors amine groups 20 to surface 14 of pores 12, which passivates (inactivates) hydroxyl groups 16 to which they anchor, making them no longer available to interact with other basic molecules. Passivation in the pretreatment step allows, and provides, for passage and diffusion of larger organic amino silanes and polymers into, and throughout, pores 12 of porous support 10 in subsequent functionalization steps described hereafter. Quantity of short-length amino silanes 30 used to pretreat and passivate surfaces 14 of pores 12 is a preselected fraction of the total available surface area of porous support 10. The selected quantity is less than is required to cover surfaces 14 with an ordered monolayer film of short-length amino silanes, i.e., a submonolayer of coverage. The term "monolayer" means the quantity of amino silanes required to completely cover the entire surface area of the pores with an ordered monolayer film. The specific surface area of the support is determined and then a quantity of the selected amino siloxane that will cover a preselected fraction (e.g., 50%) of the available surface area is added. Percentage of surface area covered is not limited. In particular, the preferred quantity of short-length amino siloxane used is between about 5% and 50% by weight of the calculated monolayer quantity. More particularly, the quantity of short-length amino silanes used is about 25% by weight of the monolayer quantity. In practice, because the quantity used represents a sub-monolayer of coverage (i.e., less than needed for a monolayer), some fraction of hydroxyl groups 16 remain along surface 14 of pores 12 between low-molecular weight amino silanes 30 attached at the surface. Short length amino silanes 30 initially introduced to pores 12 are generally uniformly distributed within pores 12 and tend to align along surface 14 of pores 12 due to their short length. {Step 102} ends with the formation of a pretreated support 75. Pretreated support 75 is air-dried at ambient temperature to remove residual solvent, but temperature is not limited thereto.

Deposition of Polyfunctional Oligomers/Polymers

Figure 2B:
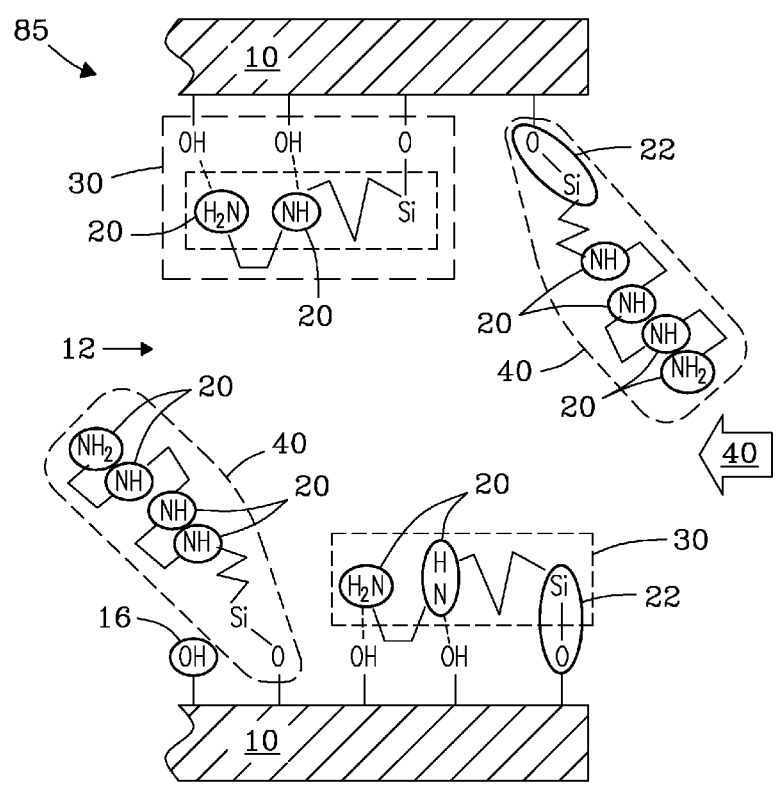
FIG. 2b shows surfaces of a pore of the silica support following deposition of polyfunctional oligomeric amine silanes.

In another functionalization step {Step 104}, illustrated in FIG. 2b, pores 12 of pretreated support 75 are further functionalized by depositing an polyfunctional oligomer/polymer 40 to surface 14 that contains a preselected density of active binding sites 20 comprised, e.g., of selected functional groups that are selective for preselected analyte(s). Functional groups include, but are not limited to, e.g., amines, imines, pyridines, and other heteroaromatic amines. Polyfunctional oligomers/polymers have a molecular weight preferably in the range from about 250 g/mole to about 1000 g/mole. More particularly, molecular weights are in the range from about 250 g/mole to about 500 g/mole. Most particularly, molecular weights are in the range from about 400 g/mole to about 450 g/mole. In a preferred embodiment, the oligomeric polyfunctional polymer is a polyfunctional oligomeric amino silane 40, e.g., polyethyleneimine (PEI) silane 40 (oligomer), but is not limited thereto. The quantity of polyfunctional oligomer/ polymer introduced in solution includes up to about 90% of the total pore volume of the porous support 10 [e.g., quantity (cubic centimeter, cc)=(selected %)×(pore volume, (cc/gram))×(grams of sample)], but is not limited thereto. In the preferred embodiment, the PEI silane 40 is prepared by dissolving the selected PEI oligomer in a solvent (e.g., toluene) and mixing it with a selected silane coupling agent (i.e., surface anchoring agent). The PEI silane 40 solution is then mixed with pretreated support 75, which permits the solution to migrate throughout the support. The PEI silane 40 chemically attaches to free hydroxyl groups 16 located on surface 14 of pores 12 between short length amines 30 previously attached in pretreatment step {Step 102} (see FIG. 2*a*). In the preferred embodiment, active binding sites 20 of the PEI silane 40 are amine groups, but are not limited thereto. {Step 104} ends with formation of intermediate functionalized support 85.

Backfilling

Figure 2C:
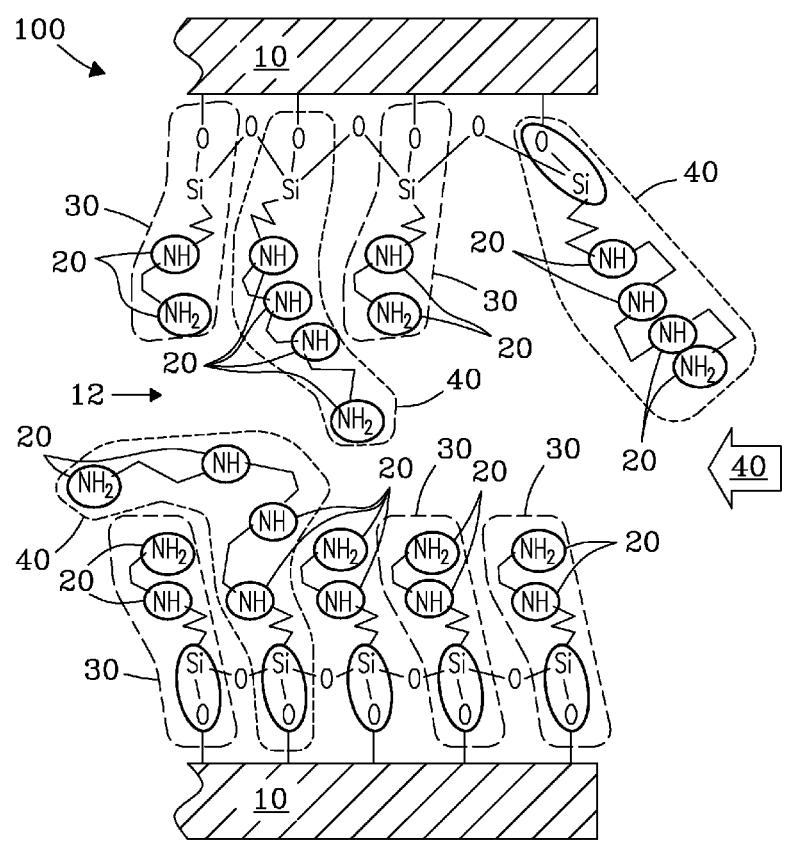
FIG. 2c shows the 3-dimensional structure of active binding sites within a pore of the silica support after backfilling with additional short-length amine silanes.

In another sequential functionalization step {Step 106}, illustrated in FIG. 2*c*, pores 12 of intermediate functionalized support 85 that contain both a sub-monolayer quantity of short-length amino silanes 30 {Step 102} and a sub-monolayer quantity of polyfunctional oligomeric amino silanes 40 {Step 104} are further functionalized by backfilling pores 12 of intermediate functionalized support 85 with another short-length amino silane 30 of a like or different kind. Short-length amino silane 30 again contains a preselected density of active binding sites 20 that are selective for preselected analyte(s). In various embodiments, the selected short-length amino silanes 30 include an amine group, e.g., an ethylenediamine group, or a diethylenetriamine group, but are not limited thereto. Newly introduced short-length amino silanes 30 are dispersed into, and within, pores 12 chemically anchoring directly to surface 14, or to free hydroxyl groups 16 located along surface 14 at locations, e.g., between both short-length amines 30 anchored in pretreatment {Step 102} and polyfunctional oligomers/polymers (e.g., PEI silanes) that were previously chemically attached in deposition step {Step 104}. The selected short-length alkoxysilanes 30 are dissolved in a solvent (e.g., toluene) and mixed with intermediate functionalized support 85 prepared in {Step 104} (see FIG. 2*b*). Chemical attachment of the backfilled amino silanes 30 to surface 14 in {Step 106} functionalizes available attachment sites along surface 14 of pores 12, maximizing the density of these highly functionalized silanes 30. The density of silanes present in pores 12 permits crosslinking to occur between siloxane groups 22 of: 1) one or more adjacent short-length amino silanes 30 previously attached, 2) polyfunctional oligomer/polymer silanes 40 previously attached, and/or 3) backfilled amino silanes 30 along highly functionalized surface 14 (e.g., between two adjacent ethylene-diamine silanes or between an ethylene diamine silane and a polyfunctional oligomeric PEI silane, etc.). Backfilling forces silanes 30 and 40 to orient in a direction substantially orthogonal to surface 14, forming a 3-dimensional functional architecture within pores 12. Active binding sites 20 defined by the selected amine functional groups on the silanes serve as sites for sorption, capture, and retention of preselected target analytes including, e.g., gas-phase target analytes. Completion of Step {106} forms the sequentially functionalized sorbent 100. Binding sites 20 of sequentially functionalized sorbent 100 can be further modified to include additional functional groups or moieties including, but not limited to, e.g, thiols, carboxylates, sulfonates, phosphonates, phosphines, heteroaromatic ligands, ammonium salts, phosphonium salts, as well as combinations of these functional groups that provide tailored and selective binding for particular target analytes. Thus, the invention is not intended to be limited to amine functional groups described in the preferred embodiment herein.

Thermal Stability

The sequentially functionalized solid-state sorbent 100 described herein comprised of a silica support 10, a sub-monolayer of short-length amino silanes 30, polyfunctional oligomers/polymers 40, and backfilled amino silanes 30 provides a high density of active binding sites 20 that are chemically anchored to surfaces 14 within pores 12 of the sequentially functionalized sorbent 100. Sorbent 100 demonstrates good thermal stability at ambient temperatures at which the sorbent is used and/or regenerated. Sorbent 100 is expected to exhibit excellent stability at temperatures up to about 175° C. in air and over 200° C. in inert atmospheres. Temperatures will depend on the selected target analyte. For example, for $CO_2$ capture, regeneration temperatures are generally in the temperature range from about 110° C. to about 115° C. No limitations are intended.

Sorption Capacity

Figure 3:
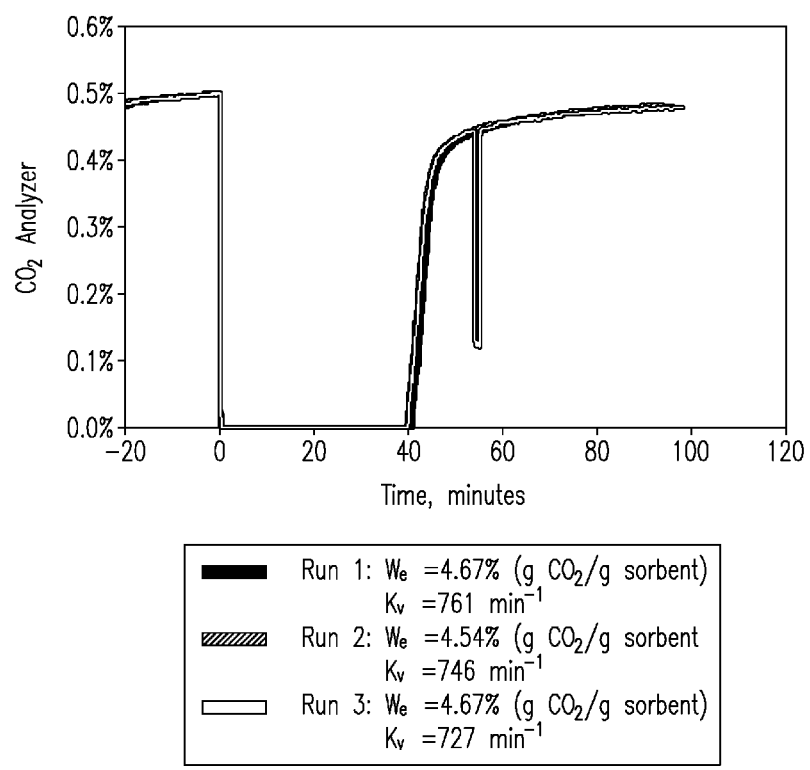
FIG. 3 shows $CO_2$ gas absorption data for the sequentially functionalized sorbent as a function of time.

The sequentially functionalized sorbent was further tested with analytes of interest to determine sorption capacity for various analytes. Analytes were shown to readily diffuse into the pore structure of the sorbent and be retained by the sorbent, e.g., in conjunction with the pendant surface chemistry described herein. Analytes, including target analyte gases, diffuse easily into pores 12 of the solid-state sorbent 100 due to the selected porosity (e.g., 50 Å to about 150 Å). The high density of active binding sites 20 provides a high sorption capacity, e.g., 5-6 wt % for $CO_2$. Thus, the sorbent is effective for capture and retention of, e.g., unwanted gases, e.g., in flue gas streams or other gas-based fluid processes. FIG. 3 presents $CO_2$ gas absorption data obtained in preliminary tests using the sequentially functionalized sorbent from a gas stream containing 0.5% (v/v) $CO_2$ in air as a function of time, measured using a non-dispersive infrared (NDIR) absorption spectrometer. The sorbent was sequentially functionalized in a 3-stage synthesis detailed in Example 4 hereafter. Baseline concentration of $CO_2$ prior to contact with the sorbent is shown at the left of the graph. At time T=0, the air stream was introduced through a bed containing the sequentially functionalized sorbent. Results show a precipitous drop in $CO_2$ concentration to below a limit of detection (~0.002%) for the NDIR measuring equipment. $CO_2$ levels equilibrate at ~0.5% following saturation (e.g., at times >40 minutes in the reported test). Results show a $CO_2$ sorption capacity of ~4.6% by weight, with sorption kinetics greater than about 700 min$^{-1}$. Preliminary tests further showed from 2 times to 23 times better sorption kinetics and approximately 2-fold better sorption capacity compared to a conventional ethylenediamine-based sorbent used as a control. The functionalized sorbent of the invention further removed over 99% of $CO_2$ from the feed stream and achieved an approximately 2.5 times lower residual concentration of $CO_2$ (at equilibration) compared to a sorbent containing ~30% MEA at a comparable capacity. Thus, the functionalized sorbent of the invention exhibits superior results compared to MEA-based liquid sorbents and other conventional solid sorbents.

The following examples will further assist in the understanding of the invention.

Example 1

Pretreatment of Porous Support

See (Step 102), FIG. 2a 5.0 g mesoporous silica (surface area: ~585 m$^2$/g; pore size: ~60 Å; pore volume: 2.45 cc/g) as a support material was suspended in 150 mL of toluene. 1.0 mL of 3-(diethylenetriamine)propyltrimethoxysilane ("DETA silane"), was added to the suspension, representing ~25% of the amount of silane needed to produce a full monolayer of coverage in the support material. The mixture was stirred and heated to a reflux temperature of 110° C. Reflux was maintained for 2 hours to pretreat the support. The pretreated support was collected by vacuum filtration, washed with isopropyl alcohol to remove reaction by-products, and air-dried. Mass of the pretreated product showed the desired sub-monolayer coverage by DETA silane was achieved.

Example 2

Deposition of Polyfunctional Oligomeric Polymer

See (Step 104), FIG. 2b

A solution containing 18.0 mL of polyethyleneimine (PEI) (423 g/mole; 1.07 g/mL; 45.5 mmole) in 100 mL of diglyme was prepared. 11.4 mL of 3-isocyanatopropyltrimethoxysilane was added to the solution and stirred overnight at ambient temperature to form PEI silane. The pretreated support product obtained in Example 1 was mixed with 10 mL of PEI silane solution, representing a solution volume less than the total pore volume of the pretreated silica support sample. The pretreated silica support sample was mixed thoroughly by rotating and stirring the mixture to obtain a uniform distribution of PEI silane in the pores of the porous silica. Sample was placed in a thick-walled thermolysis tube sealed with a threaded teflon stopper and heated in an oven at ~80° C. for 18 hours to deposit and attach PEI silane at surfaces of pores of the silica support. Product was cooled to ambient temperature, washed with isopropyl alcohol to remove reaction by-products, and air-dried. The polymer deposition step can be repeated if additional polymer loading is desired. Mass of the product showed incorporation of PEI silane. BET surface area analysis revealed that the product still maintained high surface area and an open pore structure.

Example 3

Backfilling of Intermediate Treated Support

See {Step 106}, FIG. 2c

The DETA/PEI-coated silica product from Example 2 was suspended in 150 mL of toluene and treated with 4 mL of DETA silane, representing an excess quantity (above monolayer coverage) of DETA silane. DETA silane was added to the suspension and the mixture was heated at a (solvent) reflux temperature of 110° C. for 4 hours to produce the fully functionalized sorbent product. Sorbent product was collected by vacuum filtration, washed copiously with isopropyl alcohol and air-dried. Mass of the sorbent product showed that additional DETA coverage had been achieved in the product. Brunauer, Emmett, and Teller (BET) surface area analysis revealed that the sorbent product retains a high surface area and open pore structure.

Example 4

Sorption Capacity Tests of Sequentially Functionalized Sorbent

The sequentially functionalized sorbent was prepared in a 3-stage synthesis that included: 1) pretreatment with a 12.5% DETA pre-fill; 2) a one-time deposition with PEI, which number is not limited; and 3) backfilling with DETA silane. Sorption data were characterized using a gas stream containing 0.5% $CO_2$ in air. Baseline concentration of $CO_2$ prior to contact with the sorbent is shown in FIG. 3. At time T=0, the stream of air containing $CO_2$ was introduced through a bed containing the sorbent. Results showed a precipitous drop in $CO_2$ concentration to below a limit of detection for the NDIR measuring equipment. $CO_2$ levels equilibrated at ~0.5% following saturation (e.g., at times >40 minutes in the reported test). Sorbent results showed a $CO_2$ sorption capacity of ~4.6% by weight, with sorption kinetics greater than about 700 min$^{-1}$. Preliminary tests showed from 2 to 23 times better sorption kinetics and an approximately 2-fold better sorption capacity compared to an EDA-based silica sorbent used as a control. Results for the sequentially functionalized sorbent of the invention further achieved approximately 2.5 times lower residual concentrations of $CO_2$ (at equilibration) compared to a ~30% MEA liquid sorbent at comparable capacity.

We claim:

1. A sequentially functionalized sorbent for chemical capture and retention of a target analyte, comprising:
    a porous support comprising pores functionalized with short-chain alkyl aminosilanes interspersed between polyfunctional oligomeric aminosilanes, wherein said short-chain alkyl aminosilanes include a tether group with a chain length of 4 atoms or less and a terminal amine group coupled thereto with a chain length of 7 atoms or less, wherein said short-chain alkyl aminosilanes and said oligomeric aminosilanes provide a uniform density of active binding sites within said pores defined by a quantity of nitrogen greater than or equal to about $5.0 \times 10^{-3}$ mmoL N per m$^2$ of pore surface area for chemical binding and retention of said target analyte therein.

2. The sequentially functionalized sorbent of claim 1, wherein said short-chain alkyl aminosilanes are of a size below about 20 Å and said polyfunctional oligomeric aminosilanes of a size greater than about 20 Å.

3. The sequentially functionalized sorbent of claim 1, wherein said short-chain alkyl aminosilanes are selected from the group consisting of: aminopropylsilanes; 3-(2-aminoethyl)aminopropylsilanes; 3-(diethylenetriamine)-propylsilanes; and combinations thereof.

4. The sequentially functionalized sorbent of claim 1, wherein said terminal amine group portion of said short-chain alkyl aminosilanes comprises 3-diethylenetriamine (DETA).

5. The sequentially functionalized sorbent of claim 1, wherein said short-chain alkyl amino silanes include 3-diethylenetriamine (DETA)-propyltrimethoxysilane.

6. The sequentially functionalized sorbent of claim 1, wherein said polyfunctional oligomeric alkyl aminosilanes include polyethyleneimine (PEI).

7. The sequentially functionalized sorbent of claim 1, wherein said binding sites further include a functional group selected from the group consisting of: thiols; carboxylates; sulfonates; phosphonates; phosphines; heteroaromatic ligands; ammonium salts; phosphonium salts; and combinations thereof that provides selective binding of said analyte.

8. The sequentially functionalized sorbent of claim 7, wherein said heteroaromatic ligands are selected from the group consisting of: pyridines; 1,10-phenanthroline; 2,2'-bipyridine; and combinations thereof.

9. A method for making a sorbent for retention of a target analyte, comprising the steps of:
sequentially functionalizing pores of porous support by:
1) attaching a quantity of short-chain alkyl aminosilanes within said pores to passivate surfaces therein, wherein said short-chain alkyl aminosilanes include a tether group portion with a chain length of 4 atoms or less and a terminal amine group portion with a chain length of 7 atoms or less coupled thereto, allowing unhindered passage of larger molecules within said pores thereafter;
2) interspersing polyfunctional oligomeric aminosilanes within said pores between said short-chain alkyl aminosilanes and chemically anchoring same therein; and
3) backfilling said pores with another quantity of short-chain alkyl aminosilanes to maximize density of active binding sites within said pores;
wherein said short-chain alkyl aminosilanes and said oligomeric aminosilanes provide a uniform density of active binding sites within said pores defined by a quantity of nitrogen greater than or equal to about $5.0 \times 10^{-3}$ mmol. N per $m^2$ of pore surface area for chemical binding and retention of said target analyte therein.

10. The method of claim 9, wherein said short-chain alkyl aminosilanes are of a size below about 20 Å and said polyfunctional oligomeric aminosilanes are of a size greater than about 20 Å.

11. The method of claim 9, wherein said short-chain alkyl aminosilanes are selected from the group consisting of: aminopropylsilanes; 3-(2-aminoethyl)aminopropylsilanes; 3-(diethylenetriamine)-propylsilanes; and combinations thereof.

12. The method of claim 9, wherein said terminal amine group portion of said short-chain alkyl aminosilanes comprises diethylenetriamine (DETA).

13. The method of claim 9, wherein said short-chain alkyl aminosilanes include diethylenetriamine (DETA) propyltrimethoxysilane.

14. The method of claim 9, wherein the sequentially functionalizinq includes heating said porous support at a temperature in the range from about 50° C. to about 150° C.

15. The method of claim 9, wherein said polyfunctional oligomeric aminosilanes are selected from the group consisting of: polyethylene imines; aminodendrimers; aminated polymers; aminated chitosans; aminoethylcelluloses; aminomethylpolystyrenes; and combinations thereof.

16. The method of claim 9, wherein said polyfunctional oligomeric aminosilanes include polyethylene imine (PEI).

17. The method of claim 9, wherein said polyfunctional oligomeric aminosilanes include polyethylene imine (PEI) that has been chemically modified to include a propyltrimethoxysilane anchor.

18. The method of claim 9, wherein the backfilling includes backfilling with a short-chain alkyl aminosilane selected from the group consisting of: aminopropylsilanes; 3-(2-aminoethyl)aminopropylsilanes: 3-(diethylenetriamine)-propylsilanes; and combinations thereof.

19. The method of claim 9, wherein the backfilling includes crosslinking adjacent silane groups of said short-chain alkyl aminosilanes and said polyfunctional oligomeric aminosilanes at said surfaces.

20. The method of claim 9, wherein said binding sites are further modified to include a functional group selected from the group consisting of: thiols; carboxylates; sulfonates; phosphonates; phosphines; heterocyclic aromatic rings; ammonium salts; phosphonium salts; and combinations thereof that provide selective binding of said analyte.

21. The method of claim 9, wherein said sorbent is a component of a sorption device or sorption system.

\* \* \* \* \*